Patented Apr. 19, 1938

2,114,694

UNITED STATES PATENT OFFICE 2,114,694

YEAST CONCENTRATE WITH BACTERIAL CULTURE

Leland J. Wilhartz, Chicago, and Mary Minton Brooke, Oak Park, Ill., assignors, by mesne assignments, to Puritan Mills, Inc., Chicago, Ill., a corporation of Illinois No Drawing. Application May 4, 1936, Serial No. 77,788

9 Claims. (Cl. 195—53)

The present invention relates to flavor-producing yeast concentrate for making bread and like products.

Ordinary yeast concentrate is prepared so as to be free from bacteria, because bacteria which may contaminate it are likely to be injurious to it, or to the bread. Yeast, however, is grown in bread dough or in sponge, in the presence of acid or acid-forming bacteria, particularly the lactic acid bacteria, because the acid condition promotes the growth of yeast. Such bacteria may or may not give an acid taste to bread. This condition has always inhibited development of certain other types of bacteria which may be desirable in bread.

The present invention aims to introduce a selected specific flavor into the bread by way of the yeast concentrate employed for making the bread.

It has been ascertained that a non-acid-producing bacterium, capable of flavoring bread, and compatible with yeast, especially in a non-acid fermentation process, can be combined with yeast to great advantage, without injuring the yeast. One example of such a flavoring bacteria is Bacillus subtilis. This can be grown in a medium in which yeast is grown, and the two may develop symbiotically and exist together, and even be dried together into inactive spore forms.

Yeast may thus be grown with the selected bacteria, or may be inoculated with such bacteria separately cultured. Moist active yeast may be inoculated with an active form or with a dormant form of the selected bacteria to form a "flavor-producing yeast". Or dry dormant yeast concentrates may be mixed with a medium having dormant spores of the selected bacteria.

Bacillus subtilis, for example thrives best in a non-acid, or substantially neutral medium. Hence in exercising the advantage of such bacteria in producing dough for bread, it is desirable to avoid acid or acid-forming bacteria, such as lactic acid producers commonly used in fermentation. The acid condition favors the action of the yeast. By minimizing acid, fermentation will ordinarily be slower and hence more yeast would be required.

However, the non-acid-producing bacteria of the type employed for flavor, create flavor in part by action upon protein in the mixture, converting it into amino acids or other form more available to the yeast. Hence such bacteria accelerate yeast formation over the fermentation taking place in the absence of acid, and in the absence of such bacteria. The bacteria used in this invention, therefore, compensate for the avoidance of acid-producing bacteria, even though they perform their function in an entirely different way.

One advantage of combining the bacteria with the yeast is avoidance of separate use of a "bacterial" ingredient. Another advantage is the assurance that both bacteria and yeast are added together, which is always early in the process, to avoid development of other unselected bacteria, which may prevent the desired bacterial flavoring, if the selected bacteria were added later.

Where the yeast and the bacteria are combined in active (or non-spore) form, as in a cake of compressed moist yeast, the two may be retarded in activity without being rendered dormant, by keeping the mixture cool. For example, ordinary compressed yeast inoculated with a live culture, or even with a dormant culture of Bacillus subtilis, may be kept for long periods at 40° F., or thereabouts, like the ordinary cake of yeast which is bacteria-free.

It is also to be understood that the addition of the bacteria may be in the process of manufacturing yeast. To ordinary wort used for making yeast, the selected bacteria may be added in sufficient quantity to assure its predominance over other bacteria during the generation of the yeast. The bacteria thus desirably accumulate with the yeast, and may be concentrated therewith. The inoculation may also take place after yeast is separated from the wort. Ordinarily this separated yeast is dewatered, as by use of filters and centrifuges, to form a semi-dry mass. Then water with or without starch is added to form a plastic mass which can be moulded into cakes. At this point the culture may be added. A culture may be developed in a suitable medium such as commonly used in bacteriological laboratories. For Bacillus subtilis, a liquid medium containing galactose and beef broth is suitable, when a temperature of 85° F. is used.

Bacillus subtilis and yeast cells may be dried at temperatures up to about 110° F. or higher if the action is quicker, to render both of them dormant, and therefore subject to reactivation when used for a fermentation process.

It will be understood that the invention may be used in numerous ways within the scope of the appended claims.

We claim:

1. A bread-making bacterial-yeast concentrate containing a culture predominating in selected

*Bacillus subtilis*, compatible with yeast in a bread fermentation process, and capable of flavoring bread without injury to the bread.

2. The method of making a bread-making bacterial-yeast product which comprises inoculating bread-making-yeast wort with *Bacillus subtilis* of a type which is compatible with yeast in a bread fermentation process, and capable of imparting a desirable flavor to bread without injury to the bread when the yeast product containing such bacteria is used for making bread, and recovering a yeast concentrate from the wort wherein the selected *Bacillus subtilis* is also concentrated.

3. The method of making a bread-making bacterial-yeast product which comprises separating yeast from a bread-making-yeast wort, dewatering the yeast, and inoculating the dewatered yeast with a culture of selected *Bacillus subtilis* of a type which is compatible with yeast in a bread fermentation process, and capable of imparting a desirable flavor to bread without injury to the bread when the yeast product containing such bacteria is used for making bread.

4. A bread-making bacterial-yeast product concentrate according to claim 1 in which both the yeast and the bacteria are active.

5. A bread-making bacterial-yeast product concentrate according to claim 1 in which both the yeast and the bacteria are dormant.

6. A bread-making bacterial-yeast product concentrate according to claim 1 in which the yeast is active and the selected bacteria are dormant.

7. A compressed mass of symbiotically grown bread-making yeast, and selected and cultured *Bacillus subtilis* suitable for making and flavoring bread.

8. The method of making a bread-making bacterial-yeast product which comprises inoculating a bread-making-yeast wort with *Bacillus subtilis* selected and cultured for compatibility with yeast in a bread fermentation process and also selected for flavoring the bread without injury to the bread, developing yeast in said wort whereby said bacteria develop symbiotically with said yeast, and recovering yeast from said wort wherein the selected *Bacillus subtilis* is concentrated.

9. The method of making a bread-making bacterial-yeast product which comprises inoculating a bread-making-yeast wort with *Bacillus subtilis* selected and cultured for symbiotic growth with yeast in a bread fermentation process and for flavoring bread without injury to the bread, and drying the yeast at a temperature which renders the yeast cells and the accompanying bacteria dormant but not dead.

LELAND J. WILHARTZ.
MARY MINTON BROOKE.